US010713983B2

(12) United States Patent
Fluckiger et al.

(10) Patent No.: US 10,713,983 B2
(45) Date of Patent: Jul. 14, 2020

(54) TRAVEL TOY

(71) Applicants: Kory Fluckiger, Woodruff, UT (US);
Timmy Chou, Woods Cross, UT (US)

(72) Inventors: Kory Fluckiger, Woodruff, UT (US);
Timmy Chou, Woods Cross, UT (US)

( * ) Notice: Subject to any disclaimer, the term of this patent is extended or adjusted under 35 U.S.C. 154(b) by 7 days.

(21) Appl. No.: 15/660,761

(22) Filed: Jul. 26, 2017

(65) Prior Publication Data
US 2018/0033351 A1    Feb. 1, 2018

Related U.S. Application Data

(60) Provisional application No. 62/366,966, filed on Jul. 26, 2016.

(51) Int. Cl.
| | | |
|---|---|---|
| G09F 21/04 | (2006.01) | |
| G09F 7/12 | (2006.01) | |
| B60R 11/00 | (2006.01) | |
| A63H 3/50 | (2006.01) | |
| B60R 13/00 | (2006.01) | |
| G09F 21/00 | (2006.01) | |

(52) U.S. Cl.
CPC .............. *G09F 21/04* (2013.01); *B60R 11/00* (2013.01); *B60R 13/00* (2013.01); *G09F 7/12* (2013.01); *A63H 3/50* (2013.01); *G09F 21/00* (2013.01); *G09F 2007/122* (2013.01)

(58) Field of Classification Search
CPC .......... A63H 33/26; A63H 11/06; A63H 3/50; A63H 23/10; A63H 3/04; G09F 21/04; G09F 7/04; G09F 7/12; G09F 2007/122; A47L 13/41; B66C 1/02; Y10S 273/25; B60R 11/00; B60R 13/00
USPC ............. 446/71, 72, 73, 77; 248/158, 205.5, 248/288.11
See application file for complete search history.

(56) References Cited

U.S. PATENT DOCUMENTS

| | | | | | |
|---|---|---|---|---|---|
| 1,595,987 | A | * | 8/1926 | Bennett | B60J 3/02 |
| | | | | | 248/205.5 |
| 1,728,409 | A | * | 9/1929 | Hoag | G09F 3/12 |
| | | | | | 40/667 |
| 2,767,517 | A | * | 10/1956 | Hooper | A63H 33/26 |
| | | | | | 294/65.5 |
| 2,904,336 | A | * | 9/1959 | Washburn | A63F 9/34 |
| | | | | | 273/447 |
| 3,208,173 | A | * | 9/1965 | Shank | B60T 13/00 |
| | | | | | 40/592 |
| 3,370,369 | A | * | 2/1968 | Look | G09F 15/0037 |
| | | | | | 248/230.9 |
| 3,684,288 | A | * | 8/1972 | Grace | A63F 3/062 |
| | | | | | 273/148 R |
| 4,158,925 | A | * | 6/1979 | Gagnon | G09F 21/04 |
| | | | | | 116/28 R |

(Continued)

*Primary Examiner* — Alexander R Niconovich
(74) *Attorney, Agent, or Firm* — Matthew L. Barker

(57) ABSTRACT

A placard with an image may be placed upon a rod such that a passenger of a vehicle may imagine interactions of the image with the changing surroundings of the vehicle. Ideally, the placard should be clear except of the image which may then appear on both sides of the placard. A hinged suction cup connection to the placard allows for reversibility of the placard and or the placard to continue being held on the window when in use. A tether may also be utilized to secure the placard to the rod.

16 Claims, 9 Drawing Sheets

(56) References Cited

U.S. PATENT DOCUMENTS

| | | | | |
|---|---|---|---|---|
| 4,582,017 A * | 4/1986 | Ostermiller | B60R 13/00 | 116/28 R |
| 4,677,780 A * | 7/1987 | Shuman | G09F 3/18 | 211/DIG. 1 |
| 4,881,485 A * | 11/1989 | Feinberg | B60Q 1/482 | 116/28 R |
| 5,156,274 A * | 10/1992 | Williams, Jr. | G09F 21/04 | 206/573 |
| 5,388,546 A * | 2/1995 | Lombard | B60Q 1/482 | 116/173 |
| 5,427,529 A * | 6/1995 | Dunse | A63F 3/00214 | 273/118 R |
| 5,609,121 A * | 3/1997 | Gross | B60Q 1/482 | 116/209 |
| 5,628,133 A * | 5/1997 | Cooper | G09F 21/04 | 40/591 |
| 5,636,462 A * | 6/1997 | Kleiman | G09F 7/20 | 248/126 |
| 5,974,711 A * | 11/1999 | Tipke | G09F 21/04 | 362/503 |
| 6,282,823 B1 * | 9/2001 | Brown | G09F 21/04 | 40/218 |
| 6,446,375 B1 * | 9/2002 | Davis | G09F 3/20 | 40/591 |
| 6,789,339 B2 * | 9/2004 | Blease | G09F 21/04 | 362/503 |
| 6,814,022 B1 * | 11/2004 | West | G09F 21/04 | 116/28 R |
| 7,007,418 B2 * | 3/2006 | Anderson | G09F 21/04 | 40/424 |
| 7,066,105 B2 * | 6/2006 | Tal | B60Q 1/50 | 116/173 |
| 7,090,217 B1 * | 8/2006 | Siron | A63F 3/00157 | 273/148 R |
| 7,992,333 B1 * | 8/2011 | McGuinness | G09F 3/16 | 116/28 R |
| 7,993,711 B2 * | 8/2011 | DeMoor | D04D 7/06 | 428/31 |
| 8,240,731 B2 * | 8/2012 | Roszak | E01H 1/12 | 294/212 |
| 8,487,169 B2 * | 7/2013 | Dunlop | F16M 11/041 | 248/443 |
| 9,128,668 B2 * | 9/2015 | Johnson | G06F 1/1626 | |
| 9,286,816 B2 * | 3/2016 | Stanley | G09F 21/04 | |
| 9,396,674 B2 * | 7/2016 | Larson | G09F 21/04 | |
| 10,290,243 B2 * | 5/2019 | Lanham | G09F 21/06 | |
| 2001/0034257 A1 * | 10/2001 | Weston | A63G 31/00 | 463/1 |
| 2002/0094753 A1 * | 7/2002 | Campos | A63F 9/30 | 446/486 |
| 2004/0172872 A1 * | 9/2004 | Witkowski | G09F 17/00 | 40/593 |
| 2005/0143173 A1 * | 6/2005 | Barney | A63F 13/25 | 463/37 |
| 2006/0011795 A1 * | 1/2006 | Dobbins | B60R 11/00 | 248/276.1 |
| 2006/0037370 A1 * | 2/2006 | Bright | A47K 1/09 | 70/58 |
| 2006/0154726 A1 * | 7/2006 | Weston | A63H 30/04 | 463/37 |
| 2007/0000532 A1 * | 1/2007 | Varjabedian | G09F 21/04 | 135/88.01 |
| 2007/0283875 A1 * | 12/2007 | Durkin | G09F 17/00 | 116/173 |
| 2008/0163528 A1 * | 7/2008 | Soriano Ramos | A47G 1/14 | 40/711 |
| 2009/0179750 A1 * | 7/2009 | Jachmann | B60Q 7/00 | 340/473 |
| 2011/0214598 A1 * | 9/2011 | Tucker | G09F 17/00 | 116/173 |
| 2012/0131826 A1 * | 5/2012 | Dai | F16M 11/041 | 40/597 |
| 2014/0054338 A1 * | 2/2014 | Casagrande | B60R 11/02 | 224/275 |
| 2014/0179195 A1 * | 6/2014 | Kramer | A63H 33/046 | 446/128 |
| 2015/0075042 A1 * | 3/2015 | Ebensteiner | B60Q 1/268 | 40/204 |
| 2015/0118935 A1 * | 4/2015 | Silver | A63H 33/38 | 446/484 |
| 2015/0290545 A1 * | 10/2015 | Barney | A63H 3/46 | 463/32 |
| 2017/0001125 A1 * | 1/2017 | Couch | A63H 33/26 | |
| 2017/0334683 A1 * | 11/2017 | Suh | A01K 43/00 | |
| 2017/0348593 A1 * | 12/2017 | Barney | A63F 13/235 | |
| 2018/0015364 A1 * | 1/2018 | Barney | A63F 9/24 | |
| 2018/0021688 A1 * | 1/2018 | Kramer | A63H 33/086 | 446/124 |

* cited by examiner

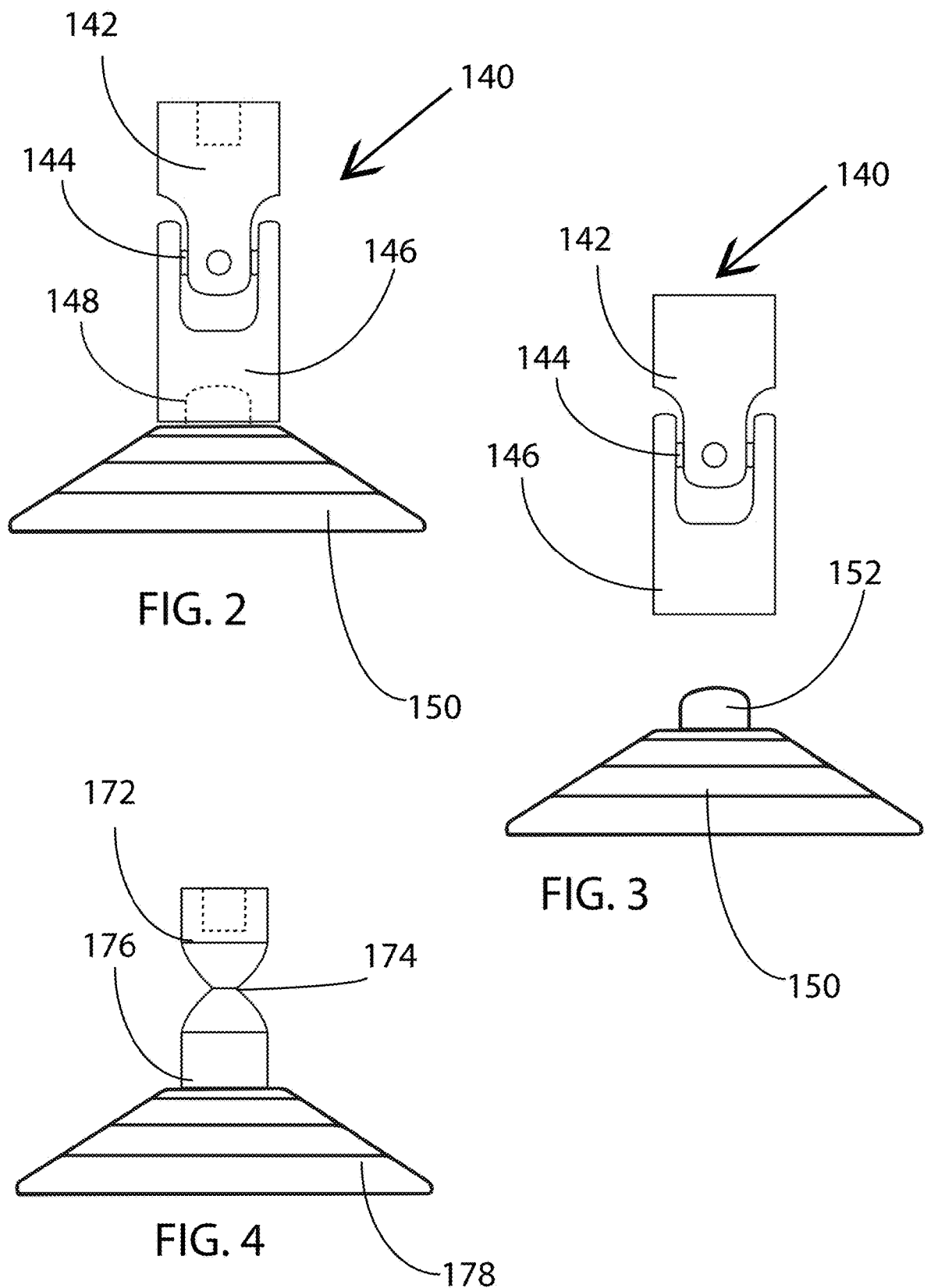

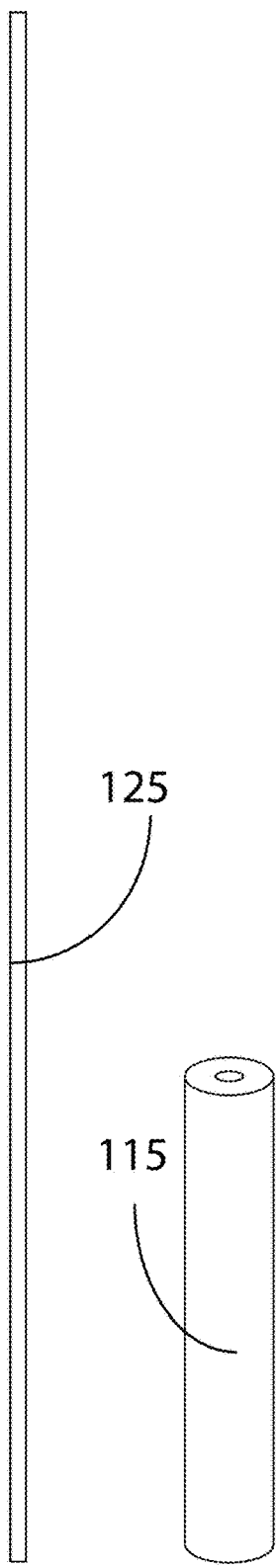
FIG. 5      FIG. 6      FIG. 7   FIG. 8

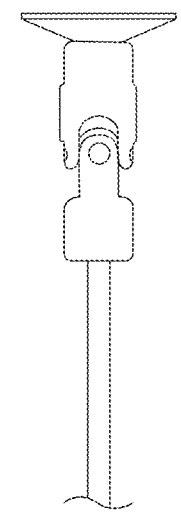
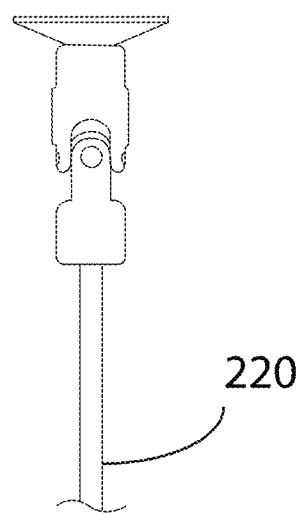
FIG. 10
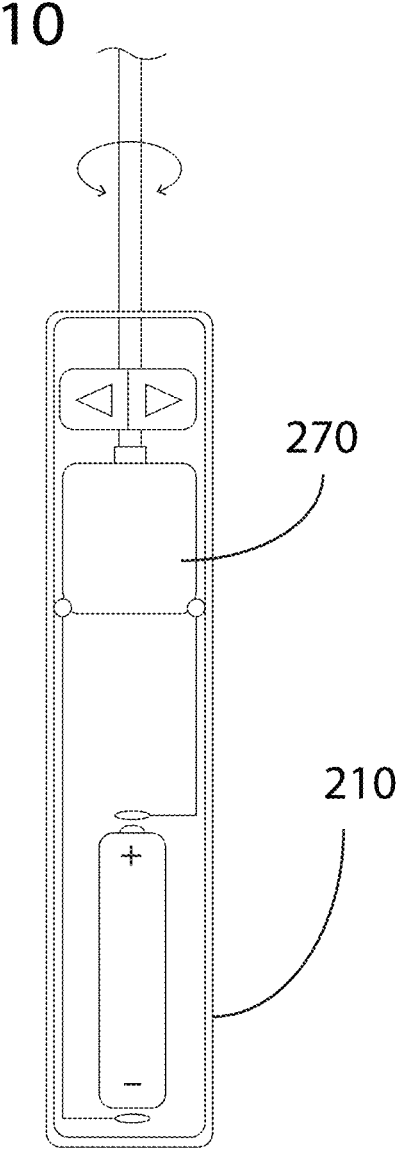
FIG. 11
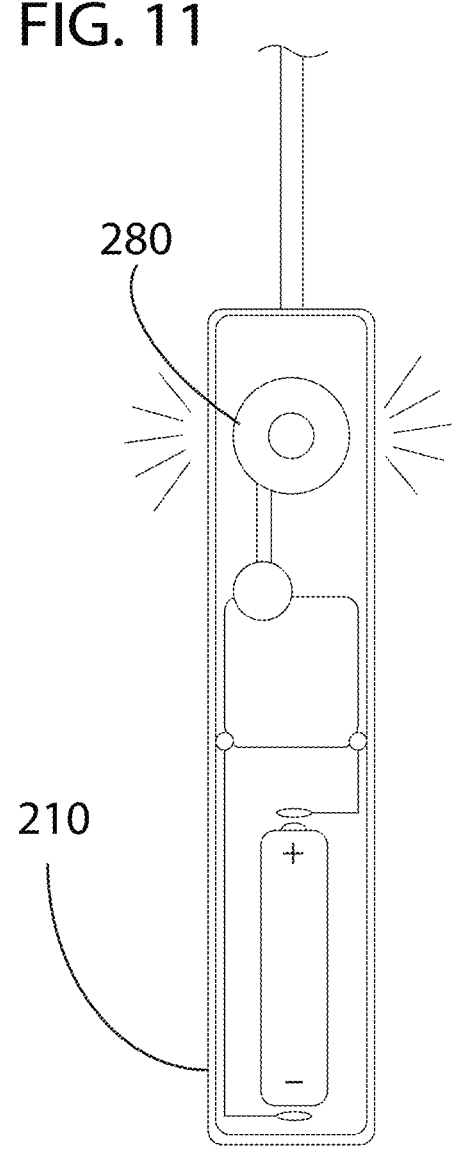

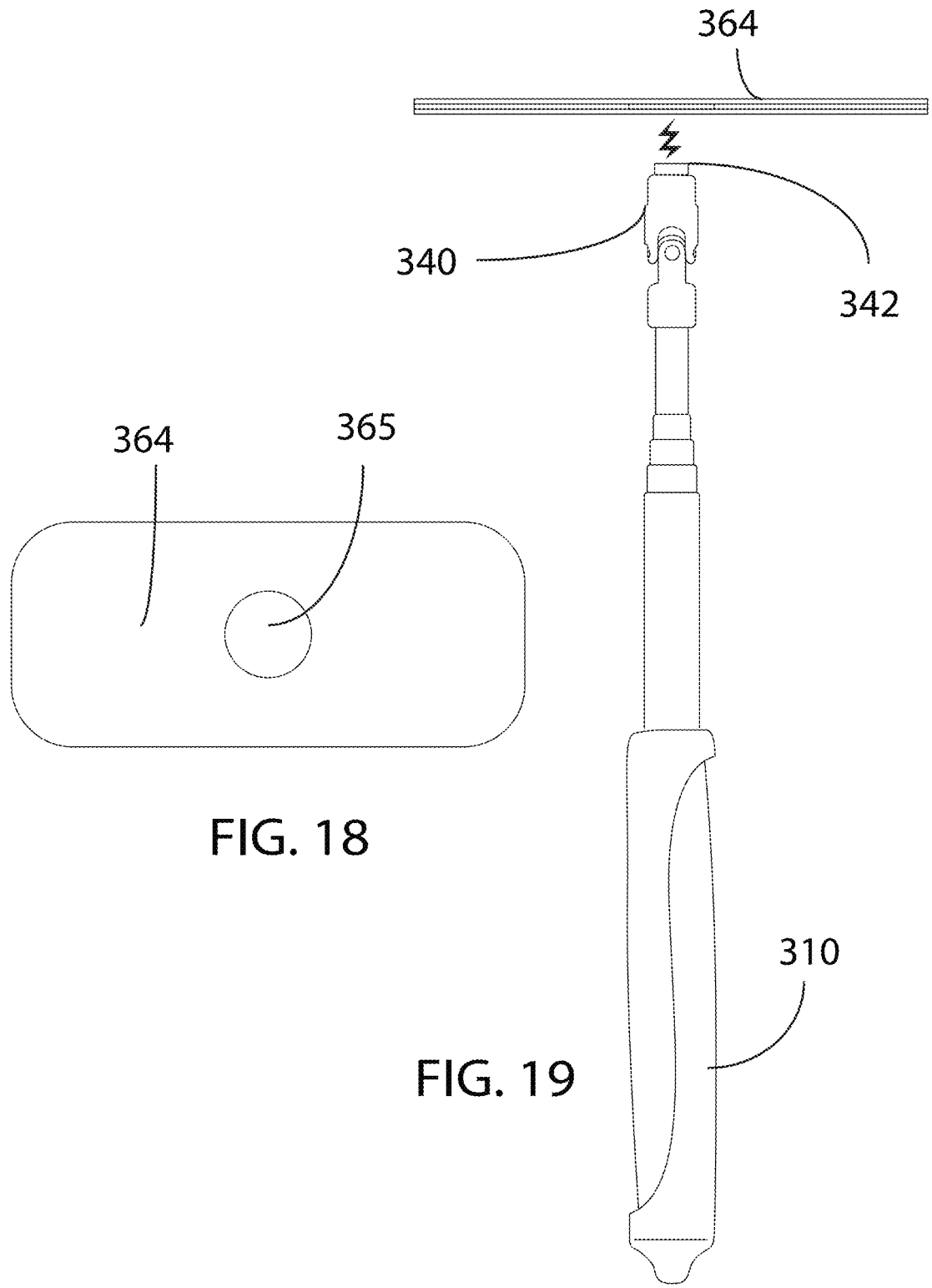

TRAVEL TOY

CROSS-REFERENCES TO RELATED APPLICATIONS

This application claims priority as a non-provisional perfection of prior filed U.S. Application No. 62/366,966, filed Jul. 26, 2017, and incorporates the same by reference herein in its entirety.

FIELD OF THE INVENTION

The present invention relates to the field of toys and more particularly relates to a toy utilized by a passenger in a vehicle with a window.

BACKGROUND OF THE INVENTION

Toys are tools that combat boredom in individuals. Good toys may also spur imagination and thought. One of the most common scenarios in which someone may become bored is during a long trip. While passenger boredom may strike any age, it is most recognized as occurring with children. Often, parents will receive the plaintive whines of their children, asking "are we there yet?" or other questions or statements. In these cases, having a distraction has proven a boon for parents. Unfortunately, the most common distraction in these times is the rear seat entertainment system—so parents are essentially pacifying their kids with television. While there are many shows which may have some redeeming educational benefit, the fact remains that television is a passive activity, both physically and mentally.

Toys have been made for use during travel. However, these toys tend to be three-dimensional and are often suspended inside the vehicle cabin, or in some cases even outside of it. Having a three-dimensional toy inside the cabin can block the driver's rear view. When outside the cabin, there is inherent risk of loss or injury or damage to the toy or to another vehicle, pedestrian, rider, etc. What is needed then, is a toy which will encourage the use of imagination while not creating a distraction or hazard.

The present invention is a toy utilizing a flat printed placard. The placard may have any image printed thereon, but the most effective would be a vehicle befitting the environment of travel. The toy then is positioned against a window by the passenger. The passenger may then imagine interactions of the printed image on the placard with the changing scenery about the vehicle.

The present invention represents a departure from the prior art in that the travel of the present invention allows for compact yet effective play by a passenger while also minimizing driver distraction.

SUMMARY OF THE INVENTION

In view of the foregoing disadvantages inherent in the known types of toys, this invention provides a simple travel toy controllable by a passenger. As such, the present invention's general purpose is to provide a new and improved travel toy that is used intuitively, provides significant entertainment while engaging imagination, and will not distract the vehicle's driver.

To accomplish these objectives, the travel toy comprises a clear placard with an image printed thereon. The placard is connected to a rod and the rod given to a passenger in a vehicle. The passenger then may move the placard against the window of the vehicle in response to the changing scenery outside the window.

The more notable features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in several ways. Also, it is to be understood that the phraseology and terminology employed herein are for description only and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is an elevation of a hinge and suction cup combination used in the travel toy of FIG. 1.

FIG. 3 is an exploded view of the hinge and suction cup combination of FIG. 2.

FIG. 4 is an alternate hinge and suction cup combination.

FIG. 5 is an elevational view of one type of rod for use in a travel toy.

FIG. 6 is an elevational view of a handle for use with the rod of FIG. 5.

FIG. 7 is an elevational view of an alternate rod for use in a travel toy.

FIG. 8 is an elevational view of a handle for use with the rod of FIG. 7.

FIG. 10 is a partial sectional view of an alternate embodiment of the invention with rotation of the wand.

FIG. 11 is a partial sectional view of an alternate embodiment of the invention with sound effects.

FIG. 18 is a top plan view of an alternate magnetic placard design.

FIG. 19 is a side elevation of an alternate embodiment utilizing a magnetic attachment of the placard.

DETAILED DESCRIPTION OF THE PREFERRED EMBODIMENT

With reference now to the drawings, the preferred embodiment of the . . . is herein described. It should be noted that the articles "a", "an", and "the", as used in this specification, include plural referents unless the content clearly dictates otherwise.

Figure 1:
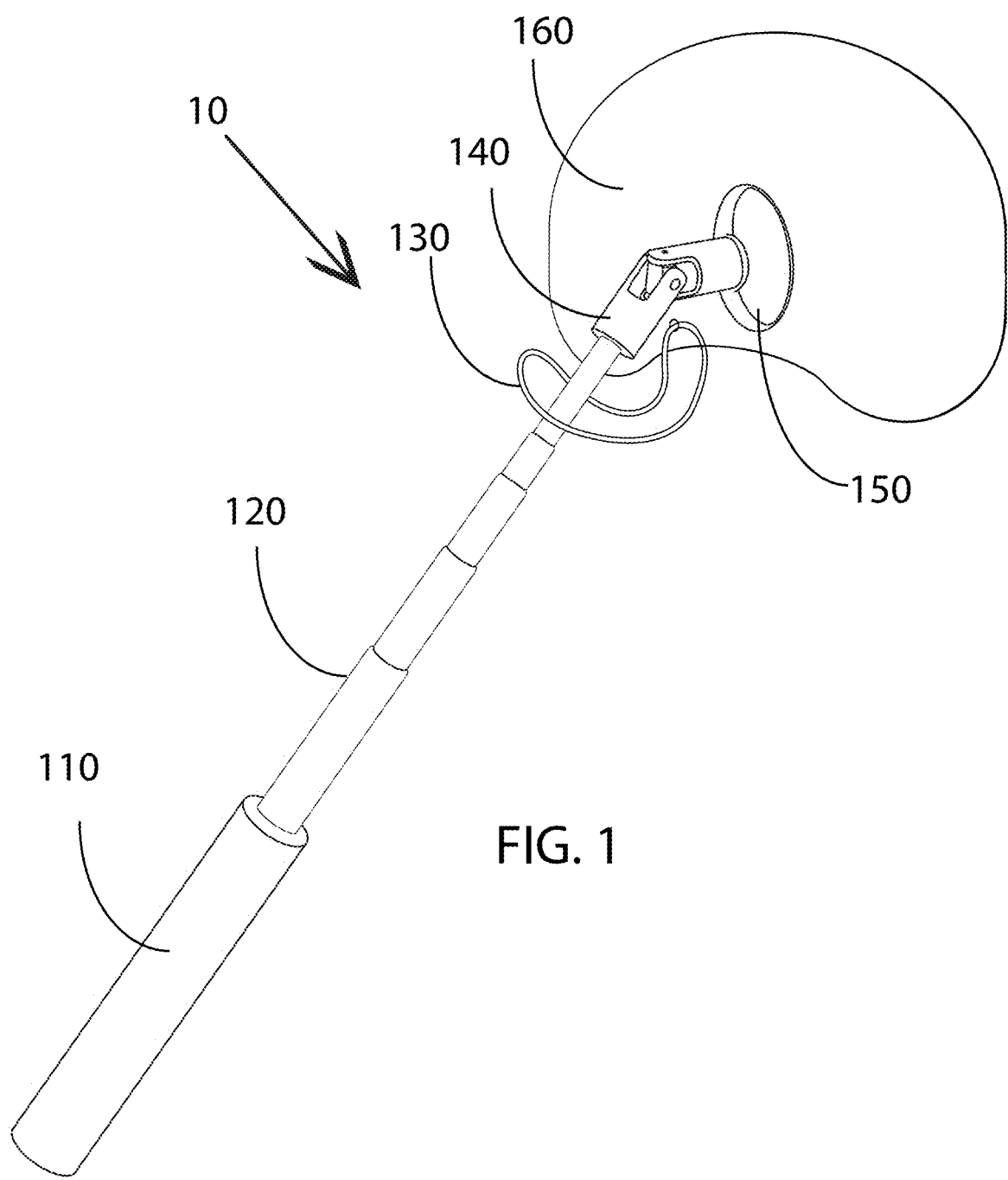
FIG. 1 is a perspective view of a travel toy.

With reference to FIG. 1, a travel toy 10 may have a placard 160 fastened to a rod 120 by means of a suction cup 150 or other means of attachment. The suction cup 150 and rod 120 are hinged 140 to allow better movement against the window glass of the vehicle. A tether 130 loops around the rod 120 and fastens to the placard 160 to keep it in place in case the means of attachment should fail. A handle 110 is also provided for comfort and better positive gripping.

The hinge 140 and suction cup 150 assembly may utilize a simple two-piece hinge as depicted in FIGS. 2 and 3. Suction cup 150 may attach to an upper hinge part 146 at a socket 148 by nub 152. The hinge structure 144 then connects the lower hinge 142 and upper hinge. A lower socket may allow connection of the rod 120. The hinge structure 144 itself may be of any construction now known or later developed. As an illustrative alternate embodiment, the suction cup 168 may be directly fused to upper hinge 166 which may be likewise fused to lower hinge 163 at neck 164. They type of hinge is not necessarily dispositive to the invention, so long as it allows the placard to remain on the window when in use.

The rod 120 may be of any design, such as the telescoping variety 120 of FIG. 5 or the solid graphite version 125 of FIG. 7. So long as it is sufficient to allow the user to place the placard against the window. Handles 110, 115 may then be of any shape or size to accommodate the rod 120, 125. Likewise, the connection to the hinge 140 may be of any design, such as the depicted socket. All that is required is a connection of sufficient strength to allow the placard 160 and hinge assembly 140 to not fall off the rod 120, 125.

Figure 9:
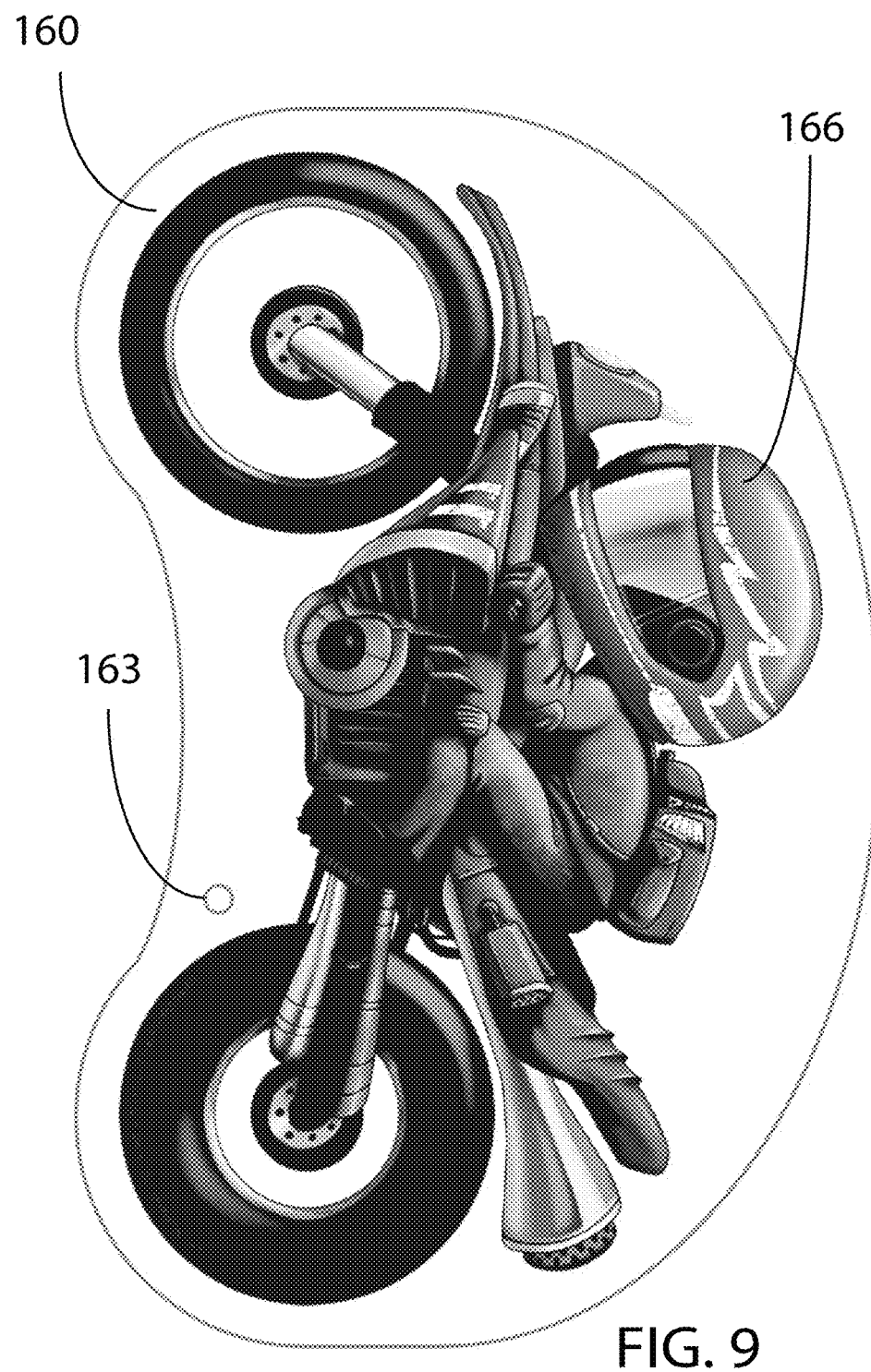
FIG. 9 is an elevational view of a placard for use with the travel toy of FIG. 1.

The placard 160 (FIG. 9) is ideally a substrate of transparent plastic that resists scratches while also not scratching window surfaces. Some character, creature, or vehicle 166 may be printed thereon. This image then provokes the interaction of the user. As surrounding scenery changes while the vehicle travels, the user may imagine interactions of the image 166 with other vehicles, obstacles, buildings, animals, bodies of water, etc. in the surrounding scenery and move the placard 160 accordingly. The image 166 should be present on both sides of the placard 160, so that the user may chose a proper direction for the image 166 to "travel." The use of transparent plastic, or some other clear substrate, allows the user to see about the image 166 against the surrounding scenery without interruption to facilitate the imagination experience. A small hole 163 may be provided for connection of the tether 130.

Figure 12:
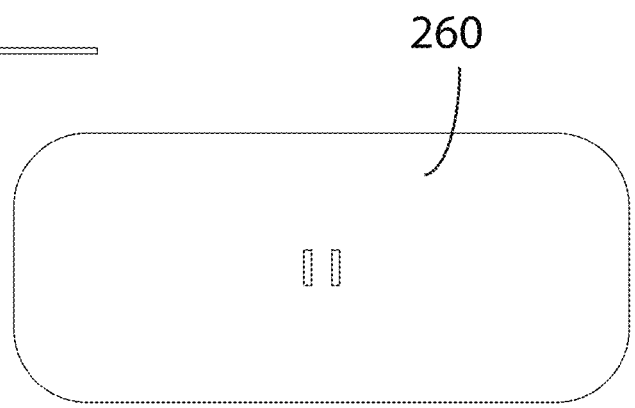
FIG. 12 is a top plan view of an alternate embodiment of the invention with a hinged head.
Figure 13:
FIG. 13 is a side elevation of the alternate embodiment of FIG. 10.
Figure 14:
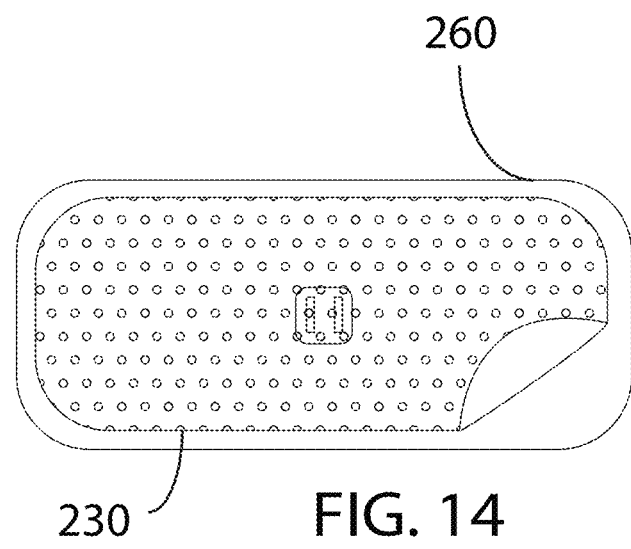
FIG. 14 is a top plan view of the alternate embodiment of FIG. 10, with a sticker applied.

Various alternate embodiments may be considered a part of the invention. Motion effects may be added by the introduction of a powered motor 270 in the handle 210, thereby imparting a motion effect on rod 220 (FIG. 10). Likewise, sound effects may be added with a similar sound generator 280 (FIG. 11). An alternate placard design 260, such as is shown in FIGS. 12-14 may be hinged and permanently attached to the rod 222. A sticker or decal 230 may then be applied to the placard for similar effect. Sticker or decal 230 may be permanent or temporary.

Figure 15:
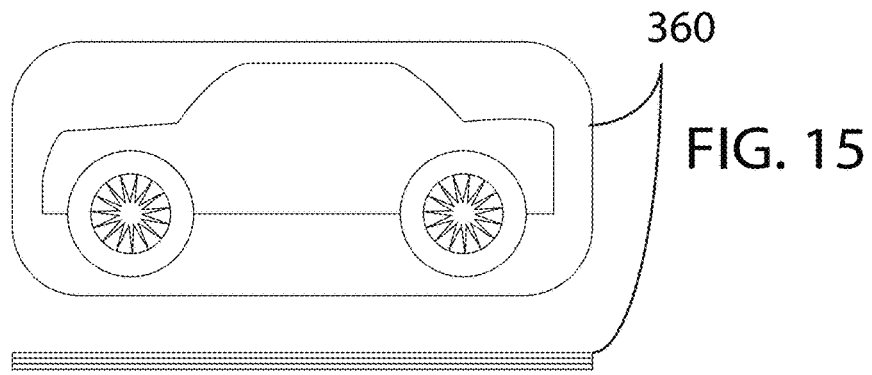
FIG. 15 is combination top plan and side elevation of a partially layered placard design.
Figure 16:
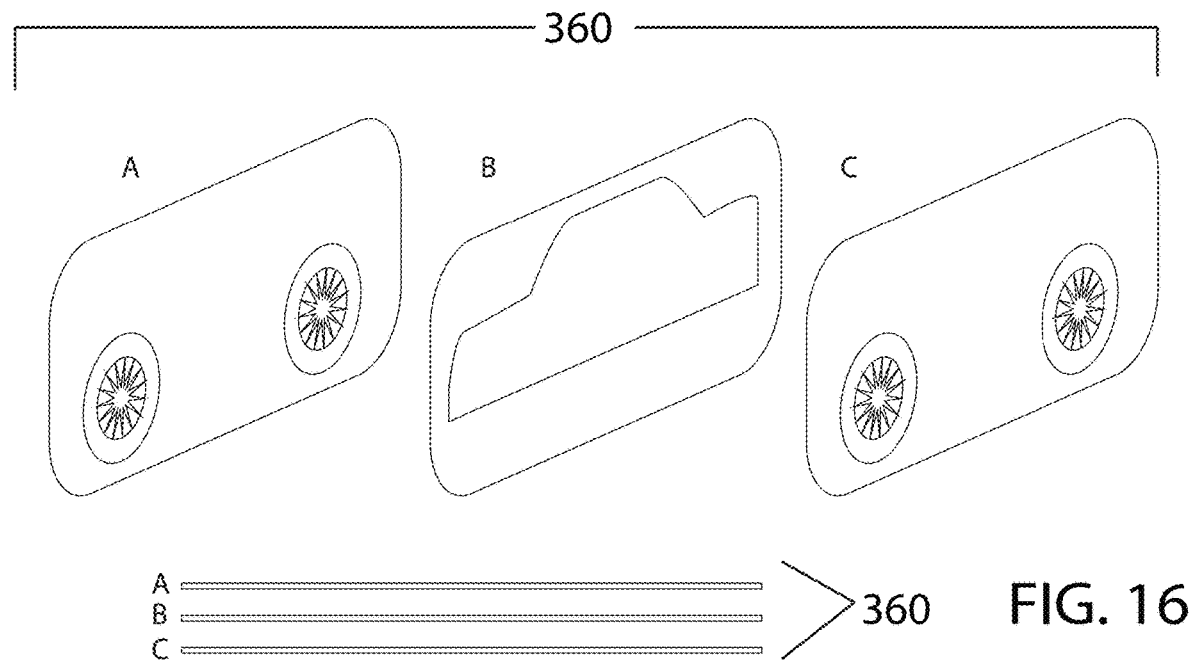
FIG. 16 is an exploded view of the multi-layered placard of FIG. 15.
Figure 17:
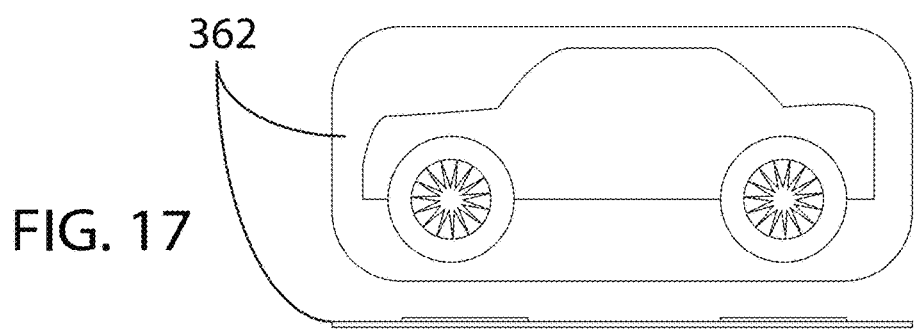
FIG. 17 is a combination top plan and side elevation of a partially layered placard design.
Figure 20:
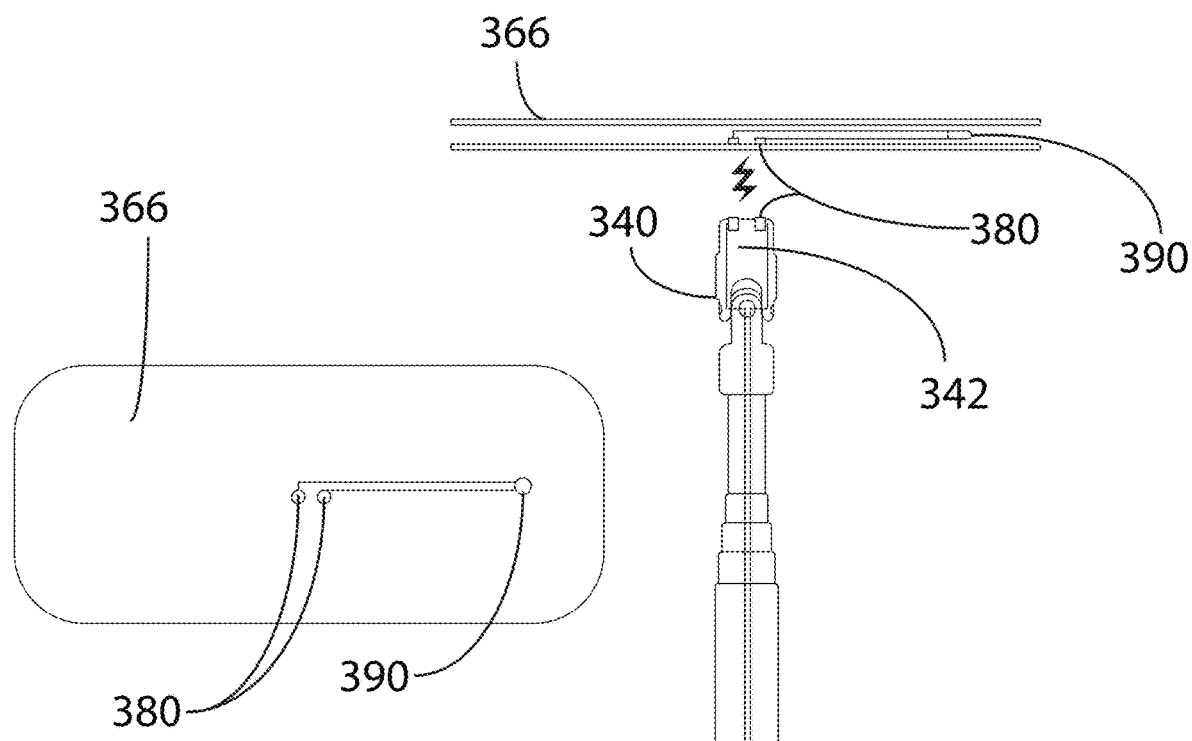
FIG. 20 is a top plan view of an alternate illuminated placard design.
Figure 21:
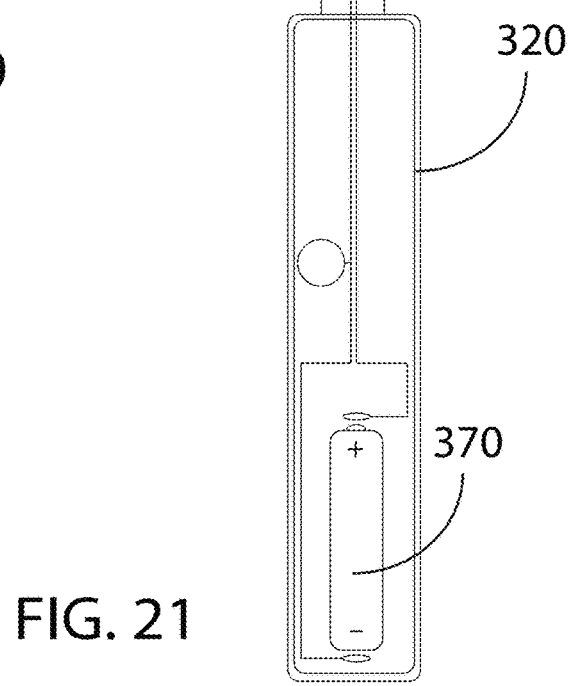
FIG. 21 is a partial sectional view of a further alternate embodiment of the invention, utilizing magnetic attachment and allowing for lighting effects.

Placards may also be made in layers for more varied effects. As shown in FIGS. 15 and 16, the use of multiple layers may create a simple three-dimensional effect in the placard 360. Different materials and effects may then be utilized in the placards. For instance, a partial lenticular or foil layer may be added to the placard 362 (FIG. 17). One layer may be UV or temperature reactive while another not. A multi-layered placard 364 may sandwich a disc of metal or other magnetic material 365, allowing for magnetic attraction 342 to the hinge 340 (FIGS. 18 and 19). This design may be further enhanced by the addition of a power supply 370 in the handle 320 and electrical contacts and traces 380 and a light source 390, like an LED, to the placard 366 (FIGS. 20 and 21).

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A toy comprising:
   a handheld wand operable to be held by a user a first end of the handheld wand, wherein a second end of the handheld wand supports a hinge and a suction cup coupled to the hinge; and
   an illustrated placard having a first planar surface and an opposing second planar surface, the first planar surface coupleable to the suction cup supported by the second end of the handheld wand, wherein the second planar surface of the illustrated placard operates to slide along an inside window surface of a vehicle in response to the user biasing the illustrated placard against the surface and moving the handheld wand relative to the window surface during movement of the vehicle, such that the illustrated placard is rotatable relative to the handheld wand via the hinge; and
   wherein the illustrated placard is rotatable in three degrees of freedom relative to the handheld wand via rotation of the hinge, such that the entirety of the second planar surface of the illustrated placard is operable to be slidably biased to the window surface of the vehicle, via rotation of the hinge, during independent movement of the handheld wand relative to the illustrated placard.

2. The toy of claim 1, wherein the suction cup is supported by an end of the hinge, such that the suction cup is movable in three degrees of freedom of movement relative to the handheld wand.

3. The toy of claim 2, wherein the other end of the hinge is attached to the second end of a telescoping portion of the handheld wand.

4. The toy of claim 1, further comprising a tether attached to the illustrated placard for coupling the illustrated placard to the handheld wand.

5. The toy of claim 1, wherein the illustrated placard comprises a substrate that is at least partially transparent.

6. The toy of claim 1, wherein the illustrated placard comprises a two-sided illustration, such that the illustrated placard is reversibly coupleable to the handheld wand via the suction cup.

7. The toy of claim 6, wherein the illustration comprises at least one of vehicles, characters, or creatures.

8. The toy of claim 1, wherein the handheld wand is telescopic to vary a length of the handheld wand.

9. The toy of claim 1, wherein the illustrated placard comprises a plurality of substrate layers substantially the same shape and overlaid to each other to define the illustrated placard, wherein at least two substrate layers of the plurality of substrates each comprise an illustration, such that the illustrations of the at least two substrate layers provides a three-dimensional effect.

10. The toy of claim 1, further comprising a motion generator supported by the handheld wand, the motion generator operable to facilitate powered movement of the illustrated placard along the surface.

11. The toy of claim 1, further comprising a sound generator supported by the handheld wand.

12. The toy of claim 1, further comprising a power source supported by the handheld wand for powering a light source supported by the illustrated placard.

13. The toy of claim 1, wherein the handheld wand is telescopic.

14. A toy operable with a vehicle window of a vehicle, comprising:
- a handheld wand comprising a first end and a second end, the first end operable to be held by a user, wherein the handheld wand is telescopic;
- a hinge coupled to the second end of the handheld wand;
- a suction cup coupled to the hinge, such that the suction cup is operable to move in three degrees of freedom of movement relative to the handheld wand via the hinge; and
- an illustrated substrate having a coupling surface removably attached to the suction cup, such that the illustrated substrate is rotatably coupled to the handheld wand via the hinge in the three degrees of freedom of movement relative to the handheld wand, wherein the illustrated substrate is comprises a window interface surface on another side of the illustrated substrate from the coupling surface, wherein an entirety of the window interface surface is slidable along a vehicle window in response to moving the handheld wand from inside the vehicle, such that the window interface surface of the illustrated substrate is configured to remain slidably biased to the window, via rotation about the hinge, while the handheld wand is moved relative to the illustrated placard from inside of the vehicle during movement of the vehicle.

15. The toy of claim 14, wherein the illustrated substrate comprises a plurality of substrate layers substantially the same shape and overlaid to each other to define the illustrated substrate, wherein at least two substrate layers of the plurality of substrate layers each comprise an illustration, such that the illustrations of the at least two substrate layers provides a three-dimensional effect.

16. The toy of claim 14, further comprising a plurality of replaceable illustrated substrates each configured to be coupled to the suction cup to replace the illustrated placard.

* * * * *